United States Patent
Kruse et al.

(12) United States Patent (10) Patent No.: US 8,615,019 B1
Kruse et al. (45) Date of Patent: Dec. 24, 2013

(54) ENHANCED UTILIZATION OF EVOLUTION DATA ONLY RESOURCES

(75) Inventors: Donald D. Kruse, Roanoke, TX (US); Edward Donofrio, Milford, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 152 days.

(21) Appl. No.: 12/263,701

(22) Filed: Nov. 3, 2008

(51) Int. Cl.
    *H04J 3/16* (2006.01)
(52) U.S. Cl.
    USPC ......................................... 370/437
(58) Field of Classification Search
    USPC .................. 370/230, 238, 235, 255, 328
    See application file for complete search history.

(56) References Cited

U.S. PATENT DOCUMENTS

| | | | | |
|---|---|---|---|---|
| 2003/0223427 A1* | 12/2003 | Chang et al. | | 370/395.3 |
| 2005/0141546 A1* | 6/2005 | Heo | | 370/447 |
| 2007/0123231 A1* | 5/2007 | Kim | | 455/414.1 |
| 2007/0280264 A1* | 12/2007 | Milton et al. | | 370/395.31 |
| 2008/0161004 A1* | 7/2008 | Burgess et al. | | 455/445 |
| 2008/0242264 A1* | 10/2008 | Malik et al. | | 455/411 |
| 2010/0103871 A1* | 4/2010 | Mooney et al. | | 370/328 |

OTHER PUBLICATIONS

"CDMA Network Security" Verizon Wireless White Paper pp. 1-41 Verizon Wireless 2007.
Wikipedia "Evolution-Data Optimized", at http://en.wikipedia.org/wiki/Evolution-Data_Optimized (last visited on Nov. 3, 2008).

* cited by examiner

*Primary Examiner* — Huy D Vu
*Assistant Examiner* — Adnan Baig

(57) ABSTRACT

A method for enhanced utilization of EVDO resources. The method includes receiving, at a control node and from an access terminal, a request for a UATI. Upon receiving the request, the control node references a database to determine whether the access terminal has been identified as subscribing to an EVDO service. If not, the access terminal is not assigned a valid UATI.

33 Claims, 7 Drawing Sheets

ENHANCED UTILIZATION OF EVOLUTION DATA ONLY RESOURCES

TECHNICAL FIELD

This disclosure relates to enhanced utilization of Evolution Data Only ("EVDO") resources.

BACKGROUND

EVDO is a telecommunications standard for the wireless transmission of data through radio signals, typically for broadband Internet access. See e.g., Wikipedia, *Evolution-Data Optimized*, at http://en.wikipedia.org/wiki/Evolution-Data_Optimized (last visited on Jun. 26, 2008). It uses multiplexing techniques such, as for example, Code division multiple access ("CDMA") and Time division multiple access ("TDMA") to maximize throughput both for individual users and the overall system. Id. To this end, EVDO can support high data rates and may be used along with voice services of wireless carriers. Id. Accordingly, it has been adopted by many mobile phone service providers, and today many access terminals (e.g., mobile phones) are EVDO capable. Id.

As a part of configuring access terminals to receive an EVDO service via an EVDO capable network, access terminals are automatically assigned a Unicast Access Terminal Identifier ("UATI"). This assignment takes place regardless of the access terminal's intended or actual use. That is, even if the access terminal does not subscribe to an EVDO service, the access terminal is assigned a UATI. The UATI may relate to an over-the-air signaling identifier that associates a mobile terminal with the access network's radio resources used during the connection and call setup procedure. Similar to an IP address, the UATI may be used by an access network controller to track the access terminal and to send and receive messages over a radio link to and from the access terminal.

Automatic assignment of UATIs to all access terminals regardless of their actual use of an EVDO service may not be beneficial because in an EVDO network domain resources are scarce, and, therefore, there is a limitation on the number of UATIs that can be assigned to the access terminals. Accordingly, the automatic assignment of UATIs to the access terminals irrespective of their actual or intended use would result in waist of resources and additional costs. Furthermore, the assignment of the UATIs to access terminals that do not or infrequently utilize EVDO resources results in unnecessary signaling traffic, a feature network designers aim to reduce.

With this in mind, there is a need for a method that can more efficiently use UATIs and that can reduce messaging for subscribers that never or infrequently use EVDO data services.

SUMMARY

The instant application describes maintaining a database that identifies mobile devices subscribing to EVDO service. In one implementation, the database is maintained and updated by a control node connecting a mobile device to a Packet Data Serving Node ("PDSN"). The control node may include a radio network controller ("RNC"). Upon receiving a request for a UATI from the mobile device, the RNC references a database to determine whether the mobile device has been identified as a device subscribing to EVDO service. If so, the RNC assigns a valid UATI to the mobile device. Otherwise, the RNC does not assign a valid UATI to the mobile device.

Specifically and according to one general aspect, the instant application describes a method for enhanced utilization of EVDO resources. The method includes receiving, at a control node and from an access terminal, a request for a UATI and referencing a database to determine whether the access terminal has been identified as subscribing to an EVDO service. The method also includes not assigning a valid UATI to the access terminal based on determining that the access terminal has not been identified as subscribing to the EVDO service.

Implementations of the above general aspect may include one or more of the following features. For example, the control node may include a radio network controller ("RNC"). For another example, the access terminal may be capable of receiving services other than the EVDO service even if the access terminal is not assigned a valid UATI.

The method may further include requesting, from the access terminal and in response to the request for the UATI, an identifier associated with the access terminal; and receiving, from the access terminal and in response to the request for the identifier, the identifier associated with the access terminal. In one implementation, referencing the database includes referencing the database to search for presence or absence of the identifier associated with the access terminal. To this end, determining that the access terminal has not been identified as subscribing to the EVDO service may include determining the absence of the identifier associated with the access terminal within the database. The database may be implemented as part of a Radio Access Network ("RAN"). Alternatively or additionally, the database may be implemented as a standalone remote database.

The method may further include receiving, from the access terminal, a connection request for an EVDO service; identifying that the access terminal is assigned the invalid UATI; and sending to the access terminal a session close signal to close a communication session associated with the invalid UATI. The method may also include receiving, from the access terminal and in response to the session close signal, a request for a second UATI and assigning, in response to the request for the second UATI, a valid UATI to the access terminal. Along these lines, the method may include forwarding the connection request for the EVDO service to a PDSN; receiving, from the PDSN, a response indicating the connection was successful; and updating the database to have an entry including the identifier associated with the access terminal, reflecting that the access terminal subscribes to the EVDO service.

In another implementation, the method may include forwarding the connection request for EVDO service to PDSN; receiving, from the PDSN, a response indicating the connection was unsuccessful; and sending to the access terminal a session close signal to close a communication session associated with the second UATI. Along these lines, the method may include receiving, from the access terminal and in response to the session close signal, a request for a third UATI and assigning, in response to the request for the UATI, an invalid UATI to the access terminal.

In another implementation, the method may include associating a set time with the entry associated with the identifier of the access terminal, and decrementing the set time after formation of the entry. The method may include deleting the entry at the expiration of the set time, and forwarding a session close signal to the access terminal to close a communication session associated with the second UATI. Alternatively, the method may include receiving, before the expiration of the set time, another connection request for EVDO service from the access terminal, and resetting the set time to its maximum value upon receiving the other connection request. The set time may be defined by a user.

In another general aspect, the method includes receiving, at a radio network controller and from first and second access terminals, a request for a UATI, and referencing a database to determine whether the first and second access terminals have been identified as subscribing to an EVDO service. The method further includes determining, based on referencing the database, that the first access terminal has been identified as subscribing to the EVDO service and that the second access terminal has not been identified as subscribing to the EVDO service. Based on determining that the first access terminal has not been identified as subscribing to the EVDO service, the method includes not assigning a valid UATI to the first access terminal. Based on determining that the second access terminal has been identified as subscribing to the EVDO service, the method includes assigning a valid UATI to the second access terminal.

In another general aspect, the present application describes a control node configured to enhance utilization of Evolution Data Only ("EVDO") resources. The control node includes a processing unit and a memory storing executable instructions for causing the processing unit to: receive, at the control node and from an access terminal, a request for a UATI; reference a database to determine whether the access terminal has been identified as subscribing to an EVDO service; and not assign a valid UATI to the access terminal based on determining that the access terminal has not been identified as subscribing to the EVDO service.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
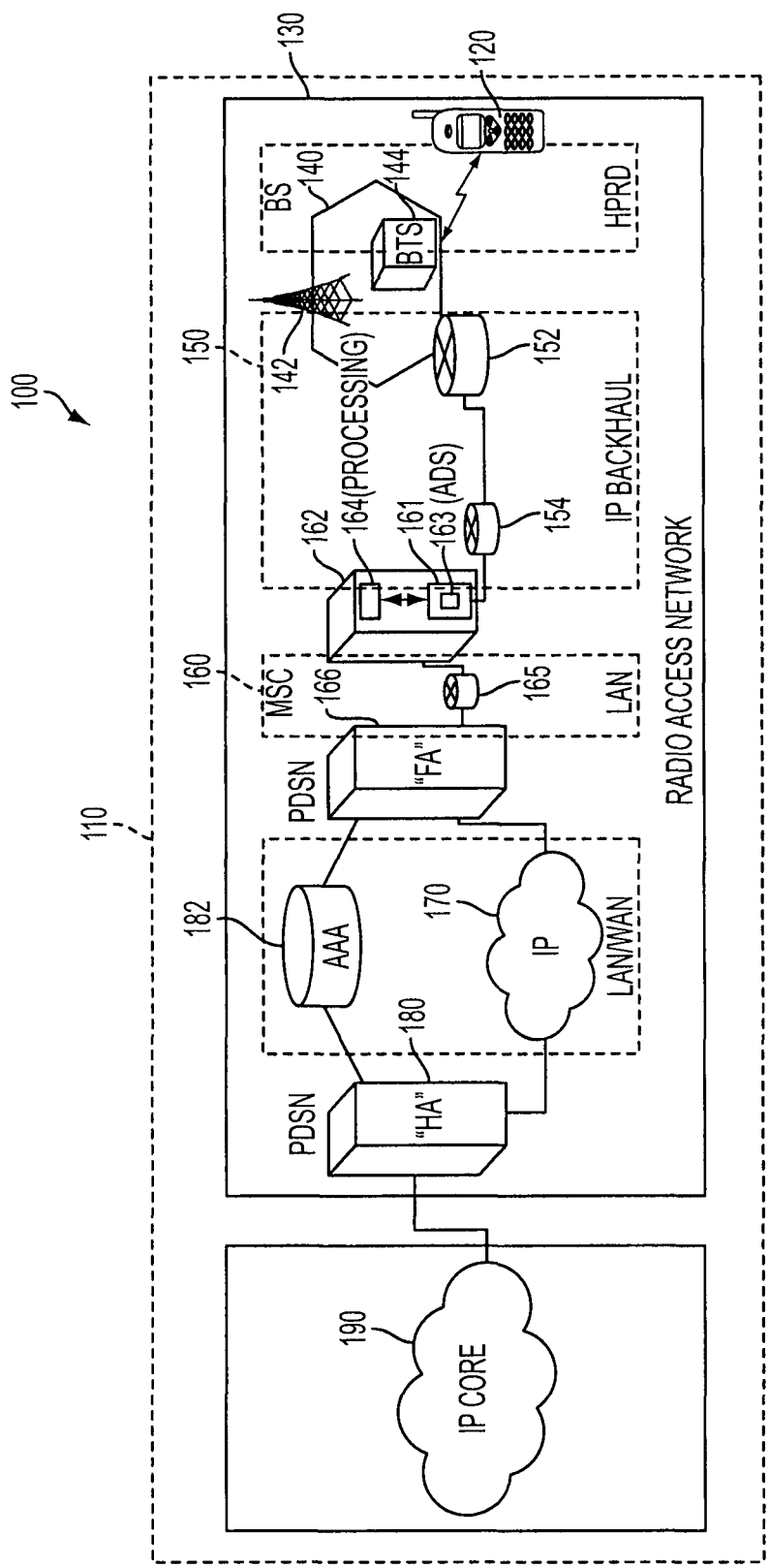
FIG. 1 illustrates a simplified functional block diagram of a packet communication network that provides wireless multimedia communications.

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

In one implementation, the application describes a method for enhanced utilization of EVDO resources. The method includes receiving, at a control node and from an access terminal, a request for a UATI. In one example, the control node includes an RNC. Upon receiving the request, the control node references a database to determine whether the access terminal has been identified as subscribing to an EVDO service. If the access terminal has not been identified as subscribing to the EVDO service, the control node does not assign a valid UATI to the access terminal. In contrast, if the access terminal has been identified as subscribing to the EVDO service, the control node assigns a valid UATI to the access terminal.

In this manner, unlike the prior art, access terminals that do not use an EVDO service are not assigned a valid UATI. As such, EVDO resources are preserved and the signaling traffic associated with idle UATIs (e.g., UATIs assigned to access terminals that never use the EVDO service) is reduced or possibly eliminated.

To illustrate one non limiting example, assume a user buys a new mobile device that is EVDO capable. Also, assume that at the time of purchase the user subscribes to the EVDO service (e.g., Verizon Navigator®). As soon as the mobile device is provisioned, the mobile device requests a UATI from the RNC (e.g., a control node). The RNC receives the request from the mobile device and, in response, references an ASD to determine whether the mobile device has been identified as subscribing to the EVDO service.

The ASD may identify mobile devices that have established a successful A10/A11 connection with the PDSN as those subscribing to an EVDO service. The A10/A11 connection acts as an interface between the radio access network and the IP network and is used to send and receive data associated with the EVDO service. As such, the A10/A11 connection can be used to differentiate mobile devices with an active EVDO service from those without the EVDO service.

With this in mind, it is possible to have a mobile device subscribing to an EVDO service but not having its identity present in the ASD. For example, if the mobile device has not yet established an A10/A11 connection, its identity may not appear in the ASD regardless of whether the associated subscriber/user actually subscribes to EVDO service. Along these lines and in keeping with the previous example, the ASD may not include information associated with the newly purchased mobile device even though the user subscribes to EVDO service.

Therefore, upon referencing the ASD, the RNC determines that the mobile device has not been identified as subscribing to an EVDO service. Accordingly, the RNC does not assign a valid UATI to the mobile device. Instead, the RNC may assign an invalid or a dummy UATI to the mobile device. This process is described in more detail below with respect to FIGS. 2 and 3.

Moving forward, when Verizon Navigator® is launched on the mobile device, the mobile device initiates an A10/A11 connection request to the RNC. The RNC realizes that the mobile device is not assigned a valid UATI and assigns a valid UATI to the mobile device. Thereafter, the RNC passes the A10/A11 connection request to the PDSN. If the passed A10/A11 connection request is successful, the RNC concludes that the mobile device subscribes to an EVDO service and sends an update to the ASD to reflect the same.

Sending an update to the ASD may include storing the mobile device's hardware identifier within the ASD for later identification of the mobile device as one subscribing to an EVDO service. This process is described in more detail below with respect to FIG. 4. Thereafter and in response to the subsequent request from the mobile device for a UATI, the RNC references the database, recognizes presence of the mobile device's identifier within the database, and assigns a valid UATI to the mobile device. This process is described in more detail below with respect to FIG. 6.

If the passed A10/A11 connection request is not successful due to either a system failure or an absence of a valid subscription for an EVDO service, the RNC concludes that the mobile device does not subscribe to an EVDO service. Therefore, the RNC does not update the ASD and sends a session close signal to the mobile device. The session close signal is configured to close the previously established session associated with the assigned valid UATI.

In this manner, the RNC retrieves the assigned valid UATI from the mobile device and may instead assign an invalid or a dummy UATI to the mobile device. This process is described below in more detail with respect to FIG. 5. The aforementioned processes, therefore, result in a more efficient use of UATIs and reduce messaging for subscribers that never use EVDO data services.

To better understand the techniques described herein, it may be helpful to consider in more detail the configuration of a mobile communication network and how its components are used to carryout the steps associated with the aforementioned processes. Therefore, the following remarks first briefly describe the components of the mobile communication network and then describe the manner in which its components carryout the various steps of the processes associated with more specific process examples of FIGS. 2-6.

FIG. 1 illustrates a simplified functional block diagram of a packet communication network that provides wireless multimedia communications. The communication network 100 includes a number of networks operated by different entities. In the examples, the various networks are operated by different network service provides or "carriers." In one implementation, communication network 100 utilizes packet transport and SIP signaling for session control purposes. One such carrier-class network is shown as a wireless network 110 in the first drawing. Although applicable to other packet communication networks, the example depicts a packet based communication network 110 for providing mobile wireless communication services, using 3GPP2 1xEVDO network architecture.

The functional block diagram shows elements of the exemplary wireless network 110, for providing packet based services, for multimedia applications such as mobile voice telephone services based on VoIP type packet communications, as well as video and/or other multimedia services. The drawing shows network elements in high-level functional block diagram form. The wireless network 110 provides packet communication services for numerous mobile devices, although for discussion purposes, the drawing shows a single mobile device 120. The mobile device 120 typically runs one or more 'client' programs for implementing the agent functionality with respect to one or more communication services that the user obtains or subscribes to through wireless network 110.

In keeping with the previous example, the client program may include Verizon Navigator® that implements the agent functionality with respect to an EVDO service that the user subscribes to through wireless network 110. The Verizon Navigator® may include capabilities of a global positioning system ("GPS"). By launching the Verizon Navigator®, the user can see a detailed map, which can be updated in real time. The map can show the present location of the user and provides the user with travel directions.

The mobile device 120 may take various forms. For example, mobile device 120 may take the form of a mobile telephone station, with display and user input capabilities to support multimedia communications. Today, such mobile telephones implementations of mobile device 120 typically take the form of portable handsets, although they may be implemented in other form factors. As another class of device examples, mobile device 120 may take the form of a personal digital assistant ("PDA") or a portable personal computer ("PC"), incorporating a wireless transceiver compatible with the particular type of wireless packet data service offered by wireless network 110. Of course, mobile device 120 may take other forms or connect to a variety of other data devices that may enable use of the communication services of network 100.

The wireless network 110 includes or implements one or more radio access networks 130, for wireless communications with mobile device 120, which receives services via wireless network 110. Physical elements of radio access network 130 include a number of base stations ("BSs") 140, only one of which is shown for convenience. Each base station 140 includes an antenna system 142 and a base transceiver system ("BTS") 144.

The BTS 144 communicates, via antenna system 142 and the air-link, with one or more of mobile devices, when the mobile devices are within range. The BTS 144 is part of radio access network 130 that sends and receives radio frequency signals carrying packets to/from the mobile devices (e.g., mobile device 120) that the base station 140 currently serves. The BTS communications over the air link with mobile device 120 provides the High Rate Packet Data Interface ("HPRD") for client data services. From mobile device 120 perspective, there will often be two or more base stations within range.

The mobile device 120 communicates through BTS 144 of base station 140, selected from among those base stations that it can detect (approximately within range) over the air, ending up with BTS 144 that provides the best Channel-to-Interference ratio. The BTS 144 includes or is associated with a data optimized module ("DOM") that controls the wireless packet communications through BS 140 and the HPRD wireless domain, including scheduling of packet transmissions on the forward link(s), in this example of the wireless portion of network 110.

The IP backhaul segment 150 connects BTS 144 to a packet based implementation of a Mobile Switching Center ("MSC") 160. This wire line segment, for example, may utilize Metro Ethernet connections provided by Regional Service providers to provide IP transport, as represented generally by routers 152, 154 and the links therebetween, for packet routing to and from BTS 144 and MSC 160. The MSC 160 includes RNC 162, router 165, and PDSN 166.

The RNC 162 includes a memory 161 and a processing unit 164 and connects BTS 144 to PDSN 166 via a local area network ("LAN") represented generally by router 165. In one implementation and as described in more detail below with respect to FIGS. 2-6, RNC 162 (e.g., processing unit 164) is configured to determine whether mobile device 120 should be assigned a valid UATI. To this end, processing unit 164 communicates with memory 161 to identify whether mobile device 120 subscribes to an EVDO service. The memory 161 includes ASD 163 that identifies mobile devices subscribing to an EVDO service. Therefore, processing unit 164 references ASD 163 to determine whether mobile device 120 has previously been identified as subscribing to an EVDO service. If so, RNC 162 assigns a valid UATI to mobile device 120. Otherwise, RNC 162 does not assign a valid UATI to mobile device 120. Instead, RNC 162 may assign an invalid or a dummy UATI to mobile device 120.

In one implementation, mobile device 120 sends an A10/A11 connection request to RNC 162. The A10/A11 connection request may be in response to launching the Verizon Navigator® on mobile device 120. The RNC 162 receives the A10/A11 connection request and determines whether mobile device 120 has been assigned a valid UATI. If so, RNC 162 forwards the A10/A11 connection request to PDSN 166. If mobile device 120 has not been assigned a valid UATI (e.g., has been assigned an invalid or a dummy UATI), before forwarding the A10/A11 connection request to PDSN 166, RNC 162 assigns a valid UATI to mobile device 120 even if the identity of mobile device 120 is not present in ASD 163. Thereafter, RNC 162 forwards the A10/A11 connection request to PDSN 166.

The PDSN 166 serves as a foreign agent ("FA") and establishes, maintains, and terminates logical links to the associated portion of radio access network 130. The PDSN 166 also supports point-to-point protocol (PPP) sessions with the mobile devices. The PDSN 166 provides the packet routing function from the radio network to/from other packet switched networks, in this case via an IP network 170 providing LAN to wide area network ("WAN") connectivity from MSC 160 to a home agent ("HA") PDSN 180, which in turn provides packet routing to/from an IP core network 190 (e.g. for Internet or Intranet access).

The agents 166 and 180 are coupled to an Authentication, Authorization, and Accounting ("AAA") server 182. At one or more points in the processing of a call or other communication session, PDSN 166 or the PDSN 180 accesses AAA server 182 to obtain call access authorization, and the PDSN 166 and the PDSN 180 provide information regarding the duration/volume of use during the session, to AAA server 182 for accounting purposes.

In keeping with the previous example, upon receiving the A10/A11 connection request, PDSN 166 may access AAA server 182 to determine whether mobile device 120 subscribes to any EVDO services. If so, PDSN 166 accepts the A10/A11 connection request initiated by mobile device 120 through RNC 162. Accordingly, RNC 162 updates ASD 163 to, for example, reflect that mobile device 120 subscribes to the EVDO service. If it is determined that mobile device 120 does not subscribe to an EVDO service, PDSN 166 rejects the A10/A11 connection request initiated by mobile device 120 through RNC 162. In one implementation, RNC 162 references ASD 163 to determine whether there is any entry associated with mobile device 120. If there is such an entry in ASD 163, RNC 162 updates ASD 163 to remove the entry therein. If there is no such entry in ASD 163, RNC 162 does not update ASD 163.

Figure 2:
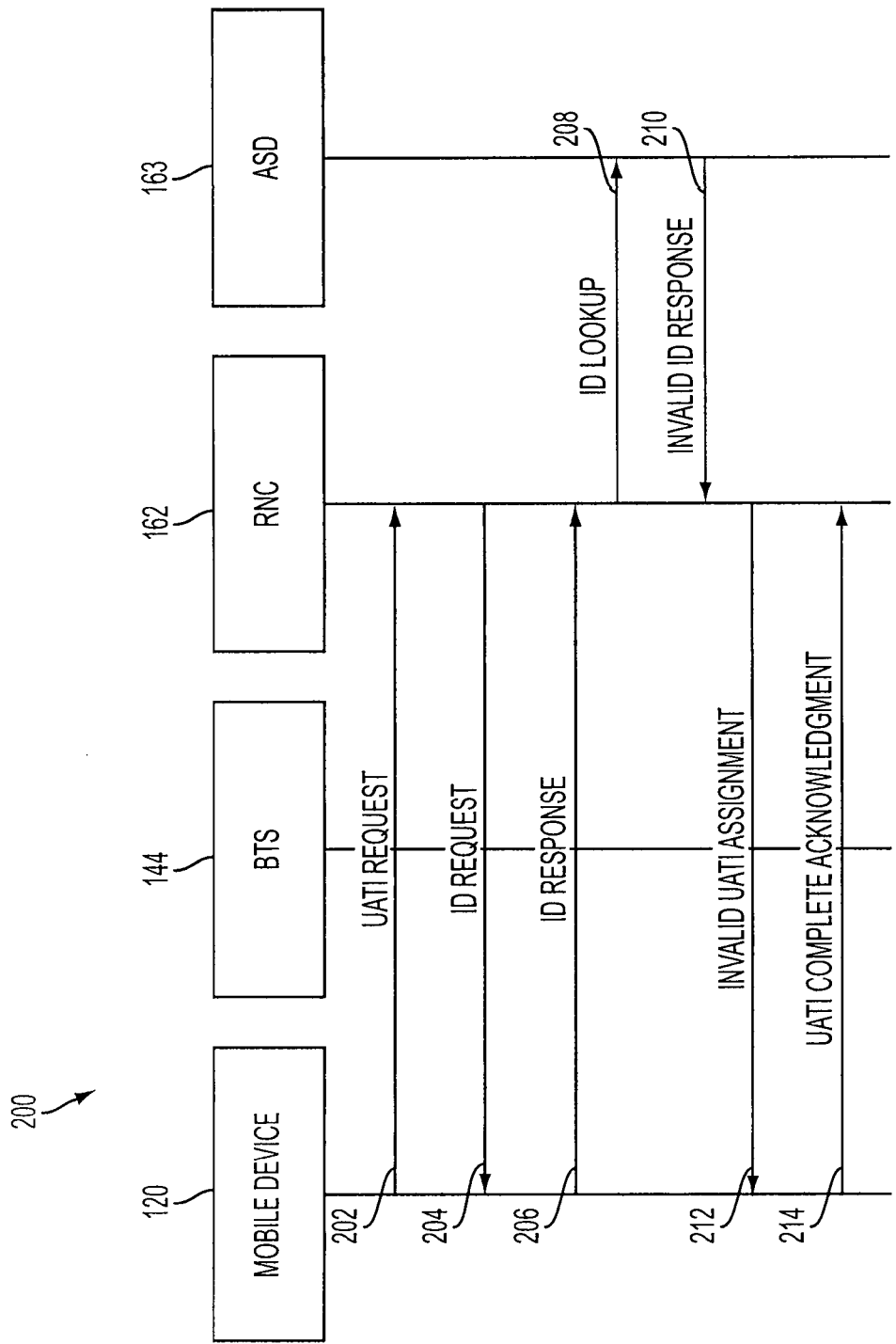
FIGS. 2 and 3 illustrate an exemplary processes used to determine whether a mobile device should be assigned a valid UATI.
Figure 3:
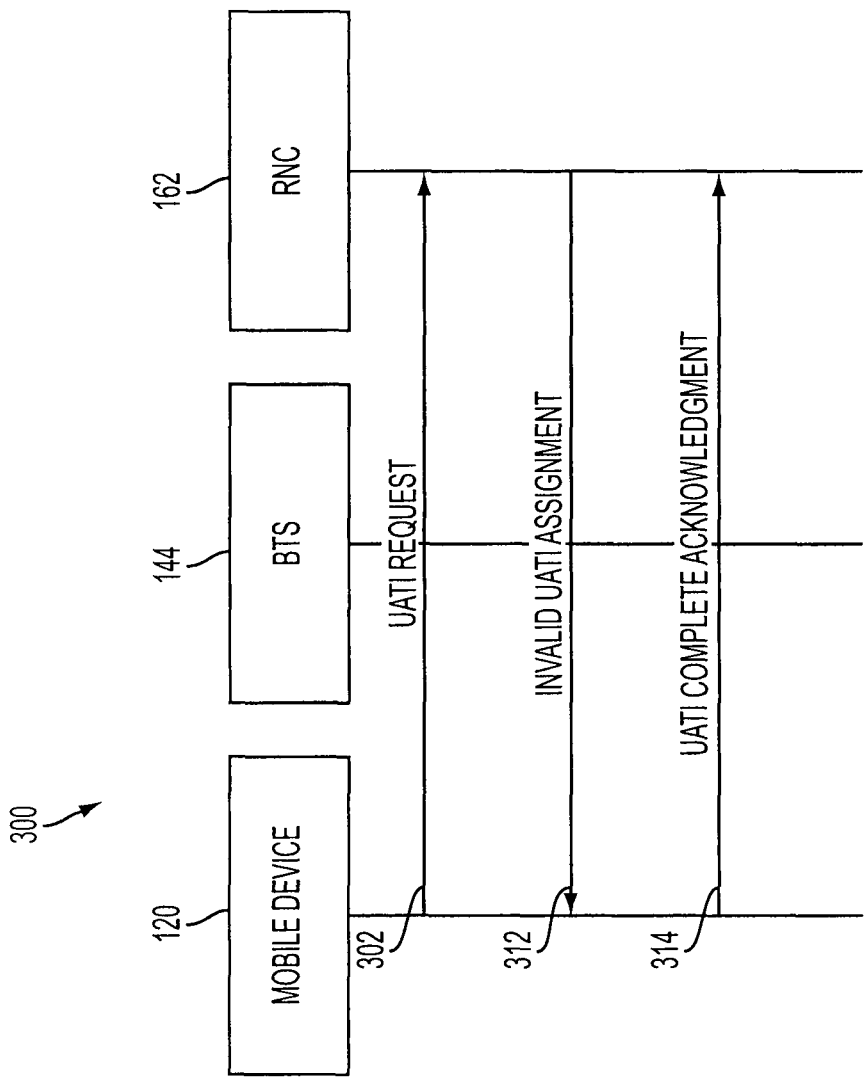

FIGS. 2 and 3 illustrate exemplary processes 200, 300 used to determine whether a mobile device should be assigned a valid UATI. The processes 200, 300 are generally similar. For ease of description, process 200 is discussed in detail, and a description of redundant aspects of process 300 is omitted for brevity. In keeping with the previous examples and for convenience, particular components described with respect to FIG. 1 are referenced as performing the processes 200, 300. More particularly, process 200 involves mobile device 120, BTS 144, RNC 162, ASD 163 and process 300 involves mobile device 120, BTS 144, and RNC 162.

The process 200 begins with mobile device 120 requesting from RNC 162 a UATI (202). For example, at a power up and during a session negotiation, mobile device 120 automatically requests from RNC 162 a UATI. This request may take place even if mobile device 120 does not subscribe to an EVDO service. To request a UATI, mobile device 120 communicates through BTS 144 of base station 140, which in turn communicates with RNC 162.

Upon receiving the request, RNC 162 requests an identifier associated with mobile device 120 (204). The identifier may for example include a hardware identifier of mobile device 120. In response, mobile device 120 forwards its identifier to RNC 162 (206). In a slightly different implementation, RNC 162 gleans the identifier of mobile device 120 in action (202). That is, RNC 162 gleans the identifier of mobile device 120 from the request for the UATI originated from mobile device 120. As such, RNC 162 may not need to solicit mobile device 120 for an identifier. In either case, RNC 162 utilizes the identifier to determine whether mobile device 120 has previously been identified as subscribing to an EVDO service. If so, RNC 162 assigns a valid UATI to mobile device 120. If not, RNC 162 does not assign a valid UATI to mobile device 120.

To determine whether mobile device 120 has previously been identified as subscribing to an EVDO service, in one implementation, RNC 162 references ASD 163 to search for presence or absence of matching identifier associated with mobile device 120 (208). The ASD 163 may include a table having a plurality of entries identifying mobile devices subscribing to an EVDO service. Each entry may be associated with a different mobile device and may include, among other features, the identifier for the mobile device. Upon first integration of ASD 163 within the network 100, however, this database is likely to be empty and naturally may not include information for mobile devices including mobile device 120.

The ASD 163 will be updated each time a successful A10/A11 connection is established between a mobile device and PDSN 166. The A10/A11 connection acts as an interface between radio access network 130 and the IP core network 190 and is used to send and receive data associated with EVDO service. As such, the A10/A11 connection can be used as a reference point to differentiate mobile devices with an active EVDO service from those without EVDO service. To this end, each time a successful A10/A11 connection is established, RNC 162 updates ASD 163 with an identifier of a mobile device associated with the connection for future reference. The ASD 163 can be implemented as part of radio access network or as a standalone remote database. The ASD 163 can be implemented at a regional level, in which case an RNC identifier may be associated with each entry in ASD 163.

Moving forward, after referencing ASD 163, RNC 162 may determine that ASD 163 does not include a matching identifier for mobile device 120 (210). This may be due to several reasons. For example, mobile device 120 may not have subscribed to an EVDO service. Alternatively, mobile device 120 may have subscribed to an EVDO service but may not have activated its subscription. In yet another example, mobile device 120 may have subscribed to an EVDO service but may not have established a successful A10/A11 connection through RNC 162, proving that mobile device 120 is indeed a subscriber of an EVDO service. In yet another example, ASD 163 may have recently been implemented within the network and, as such, may not have been updated to include information about mobile device 120.

Regardless of the reason, upon determining that ASD 163 does not include a matching identifier for mobile device 120, RNC 162 does not assign a valid UATI to mobile device 120. Instead, RNC 162 assigns an invalid or a dummy UATI to mobile device 120 (212). In response, mobile device 120 sends a "UATI complete" acknowledgement to RNC 162, acknowledging receipt of the invalid or dummy UATI (214). In this manner, the mobile devices that have not been identified as subscribing to any EVDO service are not assigned a valid UATI. Therefore, EVDO resources are preserved. The lack of assignment of a valid UATI to a mobile device does not mean that the mobile device is rendered incapable of carrying out other functions. That is, even if the mobile device is not assigned a valid UATI, it may still be able to receive services other than the EVDO service.

In one implementation, RNC 162 may not be able to request an identifier from mobile device 120 or may not be able to reference ASD 163 prior to a UATI assignment. In such a scenario, upon receiving a request for a UATI, RNC 162 automatically assigns an invalid UATI to mobile device 120. This process is illustrated with respect to FIG. 3. The process 300 is generally similar to process 200 and therefore it is not described here in more detail. In particular, the actions 302, 312, and 314 of process 300 are similar to actions 202, 212, and 214 of process 200 and therefore they are not described in more detail. The difference between processes 200, 300 is that, in process 300, RNC 162 automatically assigns an invalid UATI to mobile device 120 without referencing ASD 163.

To illustrate and in keeping with the previous example, using the above-described processes 200, 300, at the time of power up the newly purchased mobile device 120 is not assigned a valid UATI. This may occur even if the newly purchased mobile device 120 subscribes to EVDO service because ASD 163 may not yet include information about mobile device 120 (e.g., mobile device 120 has not yet established A10/A11 connection with PDSN 166). Now, assume that subscriber of mobile device 120 launches a Verizon Navigator®. In response, mobile device 120 initiates an A10/A11 connection request to RNC 162 for purposes of receiving servicing associated with the Verizon Navigator® (e.g., EVDO service).

The RNC 162 receives the A10/A11 connection request and recognizes that mobile device 120 is not assigned a valid UATI. Therefore, RNC 162 assigns a valid UATI to mobile device 120 and passes the A10/A11 request onto PDSN 166. If the passed A10/A11 connection request is successful, RNC 162 will send an update to ASD 163 with the mobile device's hardware identifier for storage on ASD 163. This process is described below in more detail with respect to FIG. 4. In contrast, if the A10/A11 connection request is not successful, RNC 162 does not update ASD 163 with the mobile devices' hardware identifier and retrieves the assigned valid UATI. This process is described below in more detail with respect to FIG. 5.

Figure 4:
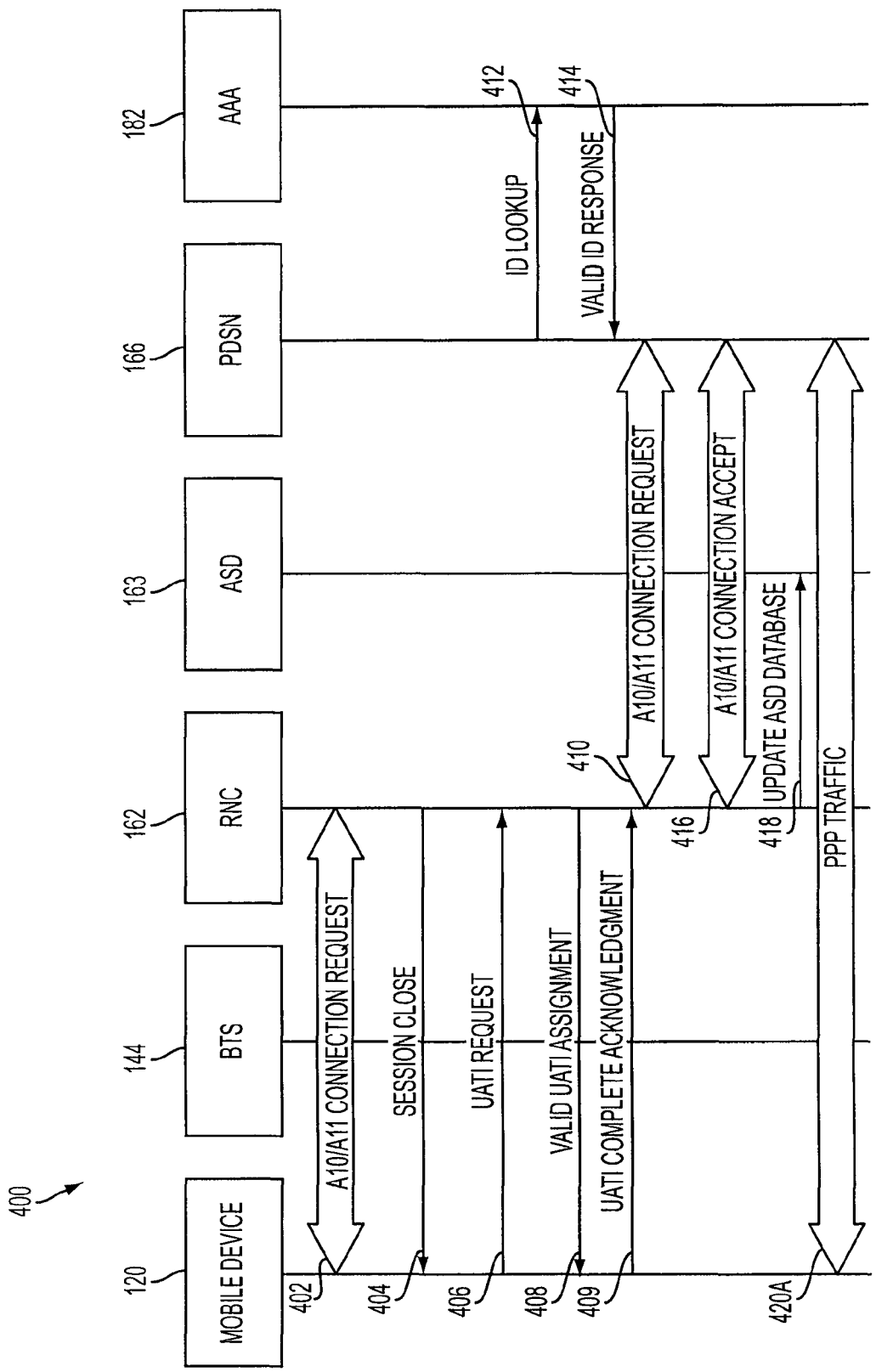
FIG. 4 illustrates an exemplary process for accepting an A10/A11 connection request and updating an Activity Status Database ("ASD") with a new entry.

FIG. 4 illustrates an exemplary process 400 for updating ASD 163 with a new entry. In keeping with the previous examples and for convenience, particular components described with respect to FIG. 1 are referenced as performing process 400. More particularly, process 400 involves mobile device 120, BTS 144, RNC 162, ASD 163, PDSN 166, and AAA 182.

Process 400 begins with mobile device 120 sending an A10/A11 connection request to RNC 162 (402). As noted above, the A10/A11 connection request is used for sending and receiving an EVDO data service. In one example, mobile device 120 sends such a request to RNC 162 when a client program (e.g., Verizon Navigator®) associated with an EVDO service is launched on mobile device 120. Alternatively, mobile device 120 may be configured to automatically send the A10/A11 connection request after being provisioned.

In either case, RNC 162 receives the A10/A11 connection request and recognizes that mobile device 120 has not been assigned a valid UATI. To do so, RNC 162 may reference an internal database including a list of mobile devices that have requested a UATI and have been assigned an invalid or a dummy UATI for either not subscribing to an EVDO service or not yet being identified as subscribing to an EVDO service. To illustrate the distinction, as noted above, a mobile device may indeed subscribe to an EVDO service but may not have yet activated the service or may not have yet established the necessary A10/A11 connection to prove to RNC 162 that it indeed subscribes to the EVDO service.

Upon identifying that mobile device 120 has been assigned an invalid UATI, RNC 162 sends a session close signal to mobile device 120 (404). The session close signal is configured to close the previous session established between mobile device 120 and RNC 162 and associated with the invalid UATI. In this manner, RNC 162 retrieves, from mobile device 120, the assigned invalid UATI. After receiving the session close signal, mobile device 120 sends a request to RNC 162 for another (e.g., a second) UATI (406). The RNC 162 receives the request and this time assigns a valid UATI to mobile device 120 (408). In response, mobile device 120 forwards to RNC 162 a "UATI complete" acknowledgment, acknowledging the receipt of the valid UATI (409).

The RNC 162 forwards the A10/A11 connection request to PDSN 166 (410). The PDSN 166 receives the A10/A11 connection request and accesses AAA server 182 to determine whether mobile device 120 subscribes to EVDO service. To this end, PDSN 166 provides AAA server 182 with the mobile device's information (e.g., the identifier of the mobile device) (412). The AAA server 182 references an internal table to determine whether mobile device 120 subscribes to any EVDO service.

If so, AAA server 182 informs PDSN 166 of the same (414), and PDSN 166 accepts the forwarded A10/A11 connection request and notifies RNC 162 of the same (416). The RNC 162 receives the indication that the A10/A11 connection request was successful and accordingly updates ASD 163 database (418). For example, RNC 162 updates the database to have an entry including the identifier associated with mobile device 120, reflecting that mobile device 120 subscribes to one or more EVDO services. In the mean time, a point-to-point protocol session is established between mobile device 120 and PDSN 166 for purposes of sending and receiving data associated with the requested EVDO service (420).

Alternatively, if mobile device 120 does not subscribe to EVDO service, AAA server 182 informs PDSN 166 of the same and PDSN 166 rejects the forwarded A10/A11 connection request. This is illustrated in more detail with respect to FIG. 5. Assuming that the A10/A11 connection request was successful and the A10/A11 connection is established, it should be noted that the A10/A11 connection may have a finite life time. That is, the A10/A11 connection may terminate if, for example, the user of mobile device 120 chooses to turn off mobile device 120 or simply chooses to terminate the Verizon Navigator®. In this scenario, mobile device 120 may send a signal to PDSN 166 instructing PDSN 166 to terminate the A10/A11 connection. Alternatively, PDSN 166 may terminate the A10/A11 connection upon expiration of an internal clock associated with the established A10/A11 connection. For example, if user of mobile device 120 does not instruct PDSN 166 to terminate the established A10/A11 connection within a predetermined time (e.g., 24 hours), PDSN 166 automatically terminates the established A10/A11 connection.

Figure 5:
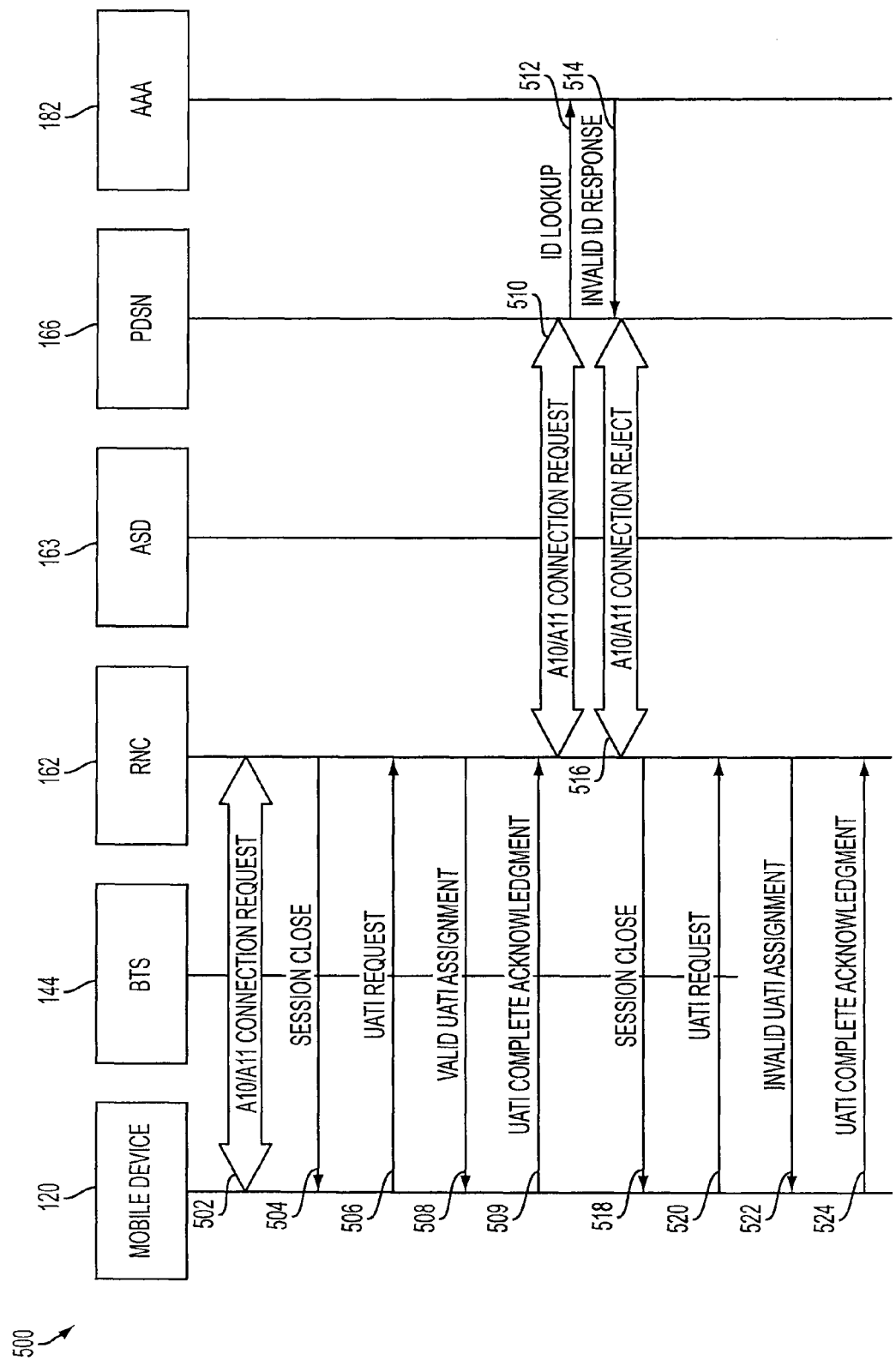
FIG. 5 illustrates an exemplary process for rejecting an A10/A11 connection request and not updating an ASD with a new entry.

FIG. 5 illustrates an exemplary process 500 for rejecting a forwarded A10/A11 connection request in which PDSN rejects the forwarded A10/A11 connection request for EVDO service. In keeping with the previous example and for convenience, components described with respect to FIG. 1 are referenced as performing process 500. More particularly, process 500 involves mobile device 120, BTS 144, RNC 162, ASD 163, PDSN 166, and AAA 182.

The beginning actions of process 500 are similar to the beginning actions of process 400. In particular, actions (502, 504, 506, 508, 509, 510, and 512) of process 500 are similar to actions (402, 404, 406, 408, 409, 410, and 412) of process 400. Therefore, these actions are not described in more detail. The difference between process 400 and process 500 is that in process 500, unlike process 400, AAA server 182 informs PDSN 166 that mobile device 120 does not subscribe to an EVDO service (514). Therefore, PDSN 166 rejects the forwarded A10/A11 connection request and notifies RNC 162 of the same (516).

The RNC 162 receives the indication that the A10/A11 connection was not successful and accordingly does not update ASD 163. Instead, RNC 162 sends a session close signal to mobile device 120 to close a communication session associated with the valid UATI previously assigned to mobile device 120 (518). In this manner, RNC 162 retrieves the assigned valid UATI. Upon receiving the session close signal from RNC 162, mobile device 120 sends a request for another UATI to RNC 162 (520). In response, RNC 162 assigns an invalid UATI to mobile device 120 (522), and mobile device forwards to RNC 162 a "UATI complete" acknowledgment (524), acknowledging the receipt of the invalid UATI.

Figure 6:
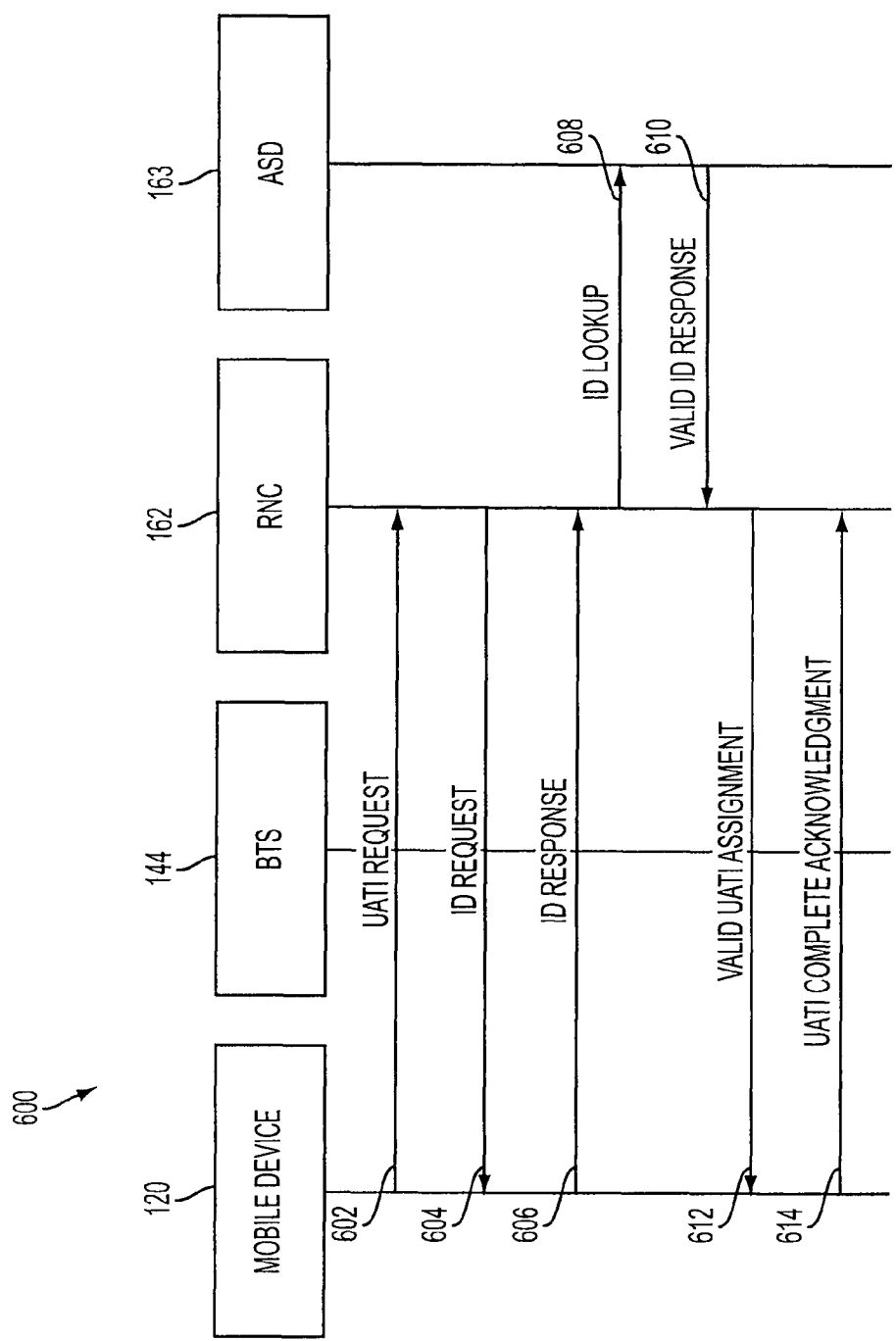
FIG. 6 illustrates an exemplary process for assigning a valid UATI to a mobile device that has been previously identified as having an associated subscription to EVDO service.

FIG. 6 illustrates an exemplary process 600 for assigning a valid UATI to a mobile device that has been previously identified as subscribing to an EVDO service. In keeping with the previous examples, components described with respect to FIG. 1 are referenced in performing process 600. More particularly, process 600 involves mobile device 120, BTS 144, RNC 162, ASD 163, and PDSN 166.

The process 600 is generally employed for a mobile device that has previously established a successful A10/A11 connection and its identity is present in ASD 163. The process 600 begins with mobile device 120 requesting from RNC 162 a UATI (602). The mobile device 120 may request a UATI, for example, after being turned on. Alternatively or additionally, mobile device 120 may request a UATI after coming within a service range of network 100. In either case, RNC 162 receives the request and, in response, sends back a request for an identifier associated with mobile device 120 (604).

The mobile device 120 receives the identifier request and provides RNC 162 with an identifier associated with mobile device 120 (606). The RNC 162 uses the identifier to identify whether mobile device 120 subscribes to any EVDO service. Toward this end, RNC 162 references ASD 163 to determine whether it includes a matching identifier for mobile device 120 (608). In keeping with the previous description with respect to FIG. 3, RNC 162 recognizes that ASD 163 includes a matching identifier for mobile device 120 and concludes that mobile device 120 subscribes to an EVDO service (610).

Accordingly, RNC 162 assigns a valid UATI to mobile device 120 (612). In response, mobile device 120 forwards a "UATI complete" acknowledgement to RNC 162, acknowledging receipt of the valid UATI (614).

Other implementations are contemplated. For example, the above-mentioned processes not only can reduce messaging for subscribers that do not use any EVDO services, but also can reduce messaging for subscribers that infrequently use EVDO services. To this end, in one implementation, a timer may be associated with each active entry in ASD 163, and the timer may be decremented with time. The fixed timer value setting or translation can be set by a system operator and may be referred to as Activity Duration Timer ("ADT"). The timer value residing in ASD 163 and assigned to active entries is referred to as Activity Duration Remaining ("ADR"). The ADR may be decremented with time.

By using the timer (e.g., ADT), RNC 162 can retrieve the assigned valid UATIs of mobile devices that infrequently use EVDO services. For example, upon expiration of the timer, RNC 162 concludes that mobile device 120 has not used any EVDO services, retrieves the previously assigned valid UATI from mobile device 120, and instead assigns a dummy or an invalid UATI to mobile device 120. Along these lines, RNC 162 may also delete the entry associated with mobile device 120 in ASD 163.

In one implementation, the timer (e.g., ADT) may be provisioned for 24 hours and may be stored in ASD 163 and in association with mobile device 120 at the time of establishing a successful A10/A11 connection. At this point, the ADT will start counting down from 24 hours and if mobile device 120 does not initiate another A10/A11 connection request within 24 hours the mobile device's record from ASD 163 is removed. In contrast, if mobile device 120 comes back with another A10/A11 connection request, the ADR is reset to its maximum value (e.g., 24 hours). In particular, A10/A11 connection request is forwarded to RNC 162, which recognizes that mobile device 120 has been assigned a valid UATI and forwards the request to PDSN 166. In addition, mobile device 120 reset the ADR to its maximum value (e.g., 24 hours).

In another implementation, provisions are contemplated to account for duplicate hardware ID entries within an ASD. For example, if an ASD is implemented at a regional level (e.g., servicing multiple RNCs), the ASD could include duplicate hardware ID entries. One way to resolve this conflict is by retaining only those hardware ID entries associated with the last known RNC. As the system's capacity grows, the ASDs may need to be implemented on a more granular basis (e.g., per RNC).

Figure 7:
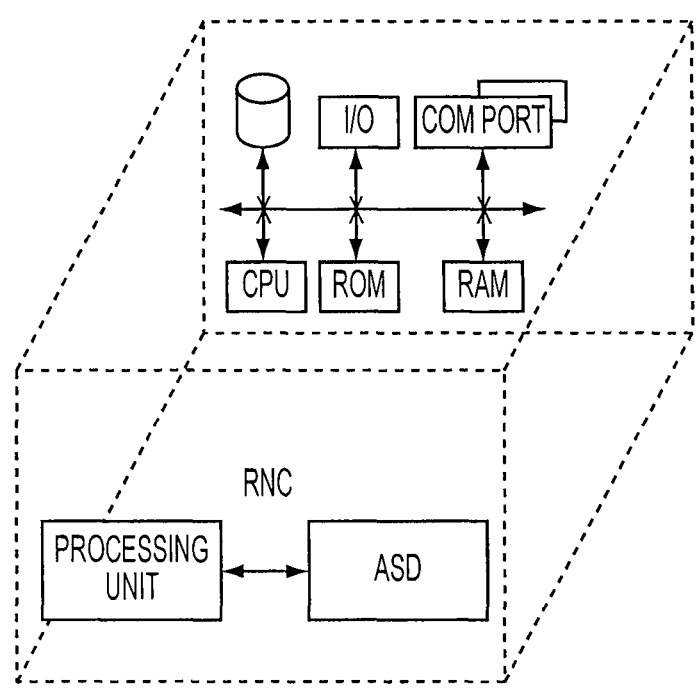
FIG. 7 illustrates the software applications or programs on the front plane of an RNC, whereas the back plane represents a high-level functional diagram of the hardware elements of such a platform.

A number of UATI management related functions discussed above are implemented in a network control node, such as that serving as RNC. Although skilled artisans should be generally familiar with RNCs, it may help some readers to discuss an example of the hardware and software that may be used in more detail. FIG. 7 illustrates the software applications or programs on the front plane of an RNC, whereas the back plane represents a high-level functional diagram of the hardware elements of such a platform.

Those skilled in the art will recognize that RNC may be implemented in a multi-processor environment or as a distributed computing system comprising a number of such computers. In the illustrated example, the RNC is implemented as a general purpose server, hosts computer or the like, although those skilled in the art will recognize that special purpose hardware may be used. The illustrated example therefore is intended to represent a class of general purpose computer hardware that may be programmed to perform its respective processing and to perform the attendant communications via the network(s). Each such computer, for example, includes a data communication interface for packet data communication.

The computer also includes a central processing unit ("CPU") in the form of one or more processors, for executing program instructions. The computer platform also includes program storage and data storage for various data files to be processed and/or communicated by the platform. The hardware elements operating systems and programming languages of such servers are conventional in nature, and it presumed that those skilled in the art are adequately familiar therewith.

The illustrated hardware may run any number of different types of software programs. The software functionalities involve programming, including executable code as well as associated stored data, e.g. objects for the testing. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enhanced utilization of EVDO resources in the RNC, in essentially the manner performed in the implementations discussed and illustrated herein. As used herein, terms such as computer or machine "readable medium" refer to any tangible storage medium that participates in providing instructions to a processor for execution.

For purposes of its operation as an RNC and related functions associated with assigning a valid or an invalid UATI to a mobile device, the processing unit of the RNC stores and executes one or more application programs for implementing a method enabling enhanced utilization of EVDO resources as described above with respect to FIGS. 2-6. To this end, the processing unit is configured to process an A10/A11 connection request from the mobile device, access ASD to perform authentication, and assign a valid or an invalid UATI based on the result of the authentication. Furthermore, the processing unit is configured to update the ASD.

The ASD identifies mobile devices subscribing to an EVDO service. For example and as noted above, the ASD may include a plurality of entries each including an identifier associated with a different mobile device and a timer. Other implementations are also contemplated.

What is claimed is:

1. A method comprising:
   receiving, at a control node and from an access terminal, a request for a Unicast Access Terminal Identifier ("UATI");
   referencing an activity status database to determine whether the access terminal has been identified as subscribing to an Evolution Data Only ("EVDO") service;
   assigning a UATI that is invalid at a time of assignment to the access terminal based on determining that the access terminal has not been identified as subscribing to the EVDO service;
   following the assigning of the invalid UATI to the access terminal, receiving a connection request from the access terminal for an EVDO service;
   in response to receiving the connection request for the EVDO service, determining whether a UATI assigned to the access terminal having transmitted the connection request is invalid by referencing a UATI database identifying access terminals having been assigned invalid UATIs; and
   upon determining that the access terminal having transmitted the connection request is identified in the UATI database as an access terminal having been assigned an invalid UATI, performing steps of:
      sending to the access terminal a session close signal to close a communication session associated with the invalid UATI;
      receiving, from the access terminal and in response to the session close signal, a request for a second UATI; and
      assigning, in response to the request for the second UATI, a valid UATI to the access terminal before the access terminal is authenticated.

2. The method of claim 1, further comprising:
   requesting an identifier associated with the access terminal, in response to the request for the UATI from the access terminal; and
   receiving, from the access terminal, the identifier associated with the access terminal in response to the request for the identifier.

3. The method of claim 2, wherein referencing the activity status database includes searching the activity status database for presence or absence of the identifier associated with the access terminal.

4. The method of claim 3, wherein determining that the access terminal has not been identified as subscribing to the EVDO service includes determining the absence of the identifier associated with the access terminal within the activity status database.

5. The method of claim 1, further comprising:
   forwarding the connection request for the EVDO service to a Packet Data Serving Node ("PDSN");
   receiving, from the PDSN, a response indicating the connection was successful; and
   updating the activity status database to have an entry including the identifier associated with the access terminal, reflecting that the access terminal subscribes to the EVDO service.

6. The method of claim 1, further comprising:
   forwarding the connection request for the EVDO service to a Packet Data Servicing Node ("PDSN");
   receiving, from the PDSN, a response indicating the connection was unsuccessful;
   sending to the access terminal a session close signal to close a communication session associated with the second UATI;
   receiving, from the access terminal and in response to the session close signal, a request for a third UATI; and
   assigning, in response to the request for the UATI, an invalid UATI to the access terminal.

7. The method of claim 5, further comprising:
   associating a set time with the entry associated with the identifier of the access terminal; and
   decrementing the set time after formation of the entry.

8. The method of claim 7, further comprising:
   deleting the entry at the expiration of the set time; and
   forwarding a session close signal to the access terminal to close a communication session associated with the second UATI.

9. The method of claim 7, further comprising:
   receiving, before the expiration of the set time, another connection request for an EVDO service from the access terminal; and
   resetting the set time to its maximum value upon receiving the other connection request.

10. The method of claim 7, wherein the set time is defined by a user.

11. The method of claim 1, wherein the activity status database is implemented as part of a Radio Access Network ("RAN").

12. The method of claim 1, wherein the activity status database is implemented as a standalone remote database.

13. The method of claim 1, wherein the control node includes a radio network controller.

14. The method of claim 1, wherein the access terminal is capable of receiving services other than the EVDO service even if the access terminal is assigned the invalid UATI.

15. A method comprising:
receiving, at a control node and from each of first and second access terminals, a request for a Unicast Access Terminal Identifier ("UATI");
determining, based on referencing an activity status database, that the first access terminal has not been identified as subscribing to an Evolution Data Only ("EVDO") service and that the second access terminal has been identified as subscribing to the EVDO service;
assigning an invalid UATI to the first access terminal based on determining that the first access terminal has not been identified as subscribing to the EVDO service, wherein the invalid UATI is invalid at a time of the assignment;
assigning a valid UATI to the second access terminal based on determining that the second access terminal has been identified as subscribing to the EVDO service;
following the assigning of the UATIs to the first and second access terminals, receiving a connection request from one of the first and second access terminals for an EVDO service;
in response to receiving the connection request for the EVDO service, determining whether a UATI assigned to the one access terminal having transmitted the connection request is invalid by referencing a UATI database identifying access terminals having been assigned invalid UATIs; and
upon determining that the one access terminal having transmitted the connection request is identified in the UATI database as an access terminal having been assigned an invalid UATI, performing steps of:
sending to the one access terminal a session close signal to close a communication session associated with the invalid UATI;
receiving, from the one access terminal and in response to the session close signal, a request for a second UATI; and
assigning, in response to the request for the second UATI, a valid UATI to the one access terminal before the one access terminal is authenticated.

16. The method of claim 15, further comprising:
requesting, from the first access terminal and in response to its request for the UATI, an identifier associated with the first access terminal;
receiving, from the first access terminal and in response to the request for the identifier, the identifier associated with the first access terminal;
requesting, from the second access terminal and in response to its request for the UATI, an identifier associated with the second access terminal; and
receiving, from the second access terminal and in response to the request for the identifier, the identifier associated with the second access terminal.

17. The method of claim 16, wherein referencing the activity status database includes searching the activity status database for presence or absence of the identifier associated with the first access terminal and the identifier associated with the second access terminal.

18. The method of claim 17, wherein:
determining that the first access terminal has not been identified as subscribing to the EVDO service includes determining the absence of the identifier associated with the first access terminal within the activity status database; and
determining that the second access terminal has been identified as subscribing to the EVDO service includes determining the presence of the identifier associated with the second access terminal within the activity status database.

19. The method of claim 15, further comprising:
forwarding the connection request for EVDO service to a Packet Data Serving Node ("PDSN");
receiving, from the PDSN, a response indicating the connection was successful;
updating the activity status database to have an entry including the identifier associated with the one access terminal, reflecting that the access terminal subscribes to the EVDO service.

20. The method of claim 15, further comprising:
forwarding the connection request for the EVDO service to PDSN;
receiving, from the PDSN, a response indicating the connection was unsuccessful;
sending to the one access terminal a session close signal to close a communication session associated with the second UATI;
receiving, from the one access terminal and in response to the session close signal, a request for a third UATI; and
assigning, in response to the request for the third UATI, an invalid UATI to the one access terminal.

21. The method of claim 19, further comprising:
associating a set time with the entry associated with the identifier of the one access terminal; and
decrementing the set time after formation of the entry.

22. The method of claim 21, further comprising:
deleting the entry at the expiration of the set time; and
forwarding a session close signal to the one access terminal to close a communication session associated with the second UATI.

23. The method of claim 21, further comprising:
receiving, before the expiration of the set time, another connection request for the EVDO service from the one access terminal; and
resetting the set time to its maximum value upon receiving the other connection request.

24. The method of claim 21, wherein the set time is defined by a user.

25. The method of claim 15, wherein the activity status database is implemented as part of a Radio Access Network ("RAN").

26. The method of claim 15, wherein the activity status database is implemented as a standalone remote database.

27. The method of claim 15, wherein the control node includes a radio network controller.

28. The method of claim 15, wherein the first access terminal is capable of receiving services other than the EVDO service even if the access terminal is not assigned a valid UATI.

29. A control node comprising:
a processing unit; and
a memory storing executable instructions for causing the processing unit to:
receive, at the control node and from an access terminal, a request for a Unicast Access Terminal Identifier ("UATI");
reference an activity status database to determine whether the access terminal has been identified as subscribing to an Evolution Data Only ("EVDO") service;
assign a UATI that is invalid at a time of assignment to the access terminal based on determining that the access terminal has not been identified as subscribing to the EVDO service;

following the assigning of the invalid UATI to the access terminal, receive a connection request from the access terminal for an EVDO service;

in response to receiving the connection request for the EVDO service, determine whether a UATI assigned to the access terminal having transmitted the connection request is invalid by referencing a UATI database identifying access terminals having been assigned invalid UATIs; and upon determining that the access terminal having transmitted the connection request is identified in the UATI database as an access terminal having been assigned an invalid UATI, further cause the processing unit to:

send to the access terminal a session close signal to close a communication session associated with the invalid UATI;

receive, from the access terminal and in response to the session close signal, a request for a second UATI; and assign, in response to the request for the second UATI, a valid UATI to the access terminal before the access terminal is authenticated.

30. The control node of claim 29, wherein the control node includes a radio network controller.

31. The control node of claim 29, wherein the memory additionally stores executable instructions for causing the processing unit to:

request an identifier associated with the access terminal, in response to the request for the UATI from the access terminal; and receive, from the access terminal, the identifier associated with the access terminal in response to the request for the identifier.

32. The control node of claim 31, wherein to reference the activity status database the memory stores executable instructions that cause the processing unit to search the activity status database for presence or absence of the identifier associated with the access terminal.

33. The control node of claim 32, wherein to determine that the access terminal has not been identified as subscribing to the EVDO service the memory stores executable instructions that cause the processing unit to determine the absence of the identifier associated with the access terminal within the activity status database.

* * * * *